United States Patent [19]

Stanfield

[11] Patent Number: 5,209,667

[45] Date of Patent: May 11, 1993

[54] TEACHING SHOELACE

[76] Inventor: James S. Stanfield, P.O. Box 1983, Santa Monica, Calif. 90406

[21] Appl. No.: 491,560

[22] Filed: Mar. 12, 1990

[51] Int. Cl.$^5$ .................................................. G09B 19/24
[52] U.S. Cl. .................................. 434/260; 24/713.2; 24/715.4
[58] Field of Search ............... 434/260; 24/713, 713.2, 24/713.3, 713.7, 713.8, 30.5 T, 30.5 R, 715, 715.3, 715.4

[56] References Cited

U.S. PATENT DOCUMENTS

| | | | |
|---|---|---|---|
| 931,949 | 8/1909 | Morrow | 24/713 X |
| 2,306,515 | 12/1942 | Wright | 24/713 |
| 2,869,205 | 1/1959 | Kacowski | 24/715.3 |
| 3,518,730 | 7/1970 | Cupler | 24/713 |
| 3,701,572 | 10/1972 | Velasquez | 24/715.3 |
| 4,273,539 | 6/1981 | Moore | 434/260 |
| 4,721,468 | 1/1988 | Alexander et al. | 434/260 |
| 4,842,522 | 6/1989 | Alexander et al. | 434/260 |
| 4,930,196 | 6/1990 | Laurin | 24/715.3 |

*Primary Examiner*—Richard J. Apley
*Assistant Examiner*—Karen Ann Jalbert

*Attorney, Agent, or Firm*—Arthur Freilich; Robert D. Hornbaker; Leon D. Rosen

[57] ABSTRACT

A shoelace is described for use by young children or the handicapped, which facilitates tying of a bow by providing a moderately stiff end portion; the stiff end portion can retain a loop shape when a pair of spaced locations on the stiff end portion are temporarily fastened together as by a pair of Velcro retainers. The shoelace is formed of a flexible shoelace core with first and second opposite end portions, and with the first end portion penetrated by a solidified, originally-liquid stiffening material. The shoelace can be made only long enough to leave ends for bow tying, when it projects directly between the uppermost eyelets of a shoe, to train a child rather than to also lace his shoes. The length is small enough that the distance (B) between the middle of the shoelace and the closest Velcro retainer (26) is less than the distance (C) between two Velcro retainers. A short tube (60) is provided through which the shoelace projects, with knots tied at opposite ends of the tube and with the tube lying under the uppermost eyelets of a shoe, to assure that opposite ends of the shoelace are of equal length. The two shoelace locations can be held together by a hook device (86, FIG. 9).

3 Claims, 2 Drawing Sheets

5,209,667

TEACHING SHOELACE

BACKGROUND OF THE INVENTION

Many children and retarded persons find great difficulty in tying their shoelaces into bows. U.S. Pat. Nos. 4,721,468 and 4,842,522 describe a training shoelace with moderately stiff end portions having spaced Velcro retainers (hook and loop type retainers). When the Velcro retainers are pressed together, the shoelace end portion retains a loop shape, which greatly aids in tying a bow.

The above-described patents describe a moderately stiff shoelace formed by an ordinary woven shoelace core and a copper wire threaded through the core to stiffen it. While this construction results in sufficient stiffness, the wire can "kink" if a loop portion is pulled tight, and thereafter tends to retain a sharp curve at the formerly kinked location. The wire also tends to also have a memory of the shape to which it was previously bent, which hampers tying of a bow.

The Velcro retainers can be mounted by sewing Velcro pads to a shoelace core. The Velcro pads add to the thickness of shoelace portions, and the miniature hooks and loops of the Velcro create drag, that both can hamper tying of a shoelace.

It is sometimes desirable to quickly mount a training shoelace on a shoe just for teaching purposes, and to be able to quickly remove it. However, the need to thread the lace through all of the eyelets of the shoe makes the process tedious. In addition, it often happens that after threading the shoelace through all the eyelets, that one end is significantly longer than the other, and time must be taken to adjust the shoelace so the ends are equal to facilitate tying. A teaching shoelace with moderate stiffness but without memory or the other advantages of a copper wire within a fabric shoelace, which provided a low cost retainer for holding a bow shape which minimized drag, and which could be rapidly installed and removed from a shoe with the projecting shoelace end portions easily kept to be of equal lengths, would be of considerable value in the teaching of the tying of a bow.

SUMMARY OF THE INVENTION

In accordance with one embodiment of the present invention, a teaching shoelace is provided that facilitates bow tying. The shoelace includes a flexible shoelace core such as of woven fabric, having first and second opposite end portions, and stiffening material at at least the first end portion. The stiffening material is a solidified, originally-liquid material which penetrates the shoelace core. The stiffening material can be applied by dipping the first end portion of the shoelace into a bath of solidifiable liquid stiffening material, withdrawing the shoelace from the bath, and wiping off the stiffening material. This leaves stiffening material which has penetrated the shoelace core and leaves a small amount on the surface of the core. The stiffening material can also add color to differentiate the first end portion from the opposite second end portion.

Instead of providing a teaching shoelace long enough for threading through all the eyelets of a shoe, applicant can provide a shoelace only long enough to leave end portions for bow tying, when the shoelace extends directly between the uppermost eyelets of a shoe. Thus, the teaching shoelace is used only to teach, rather to also tighten the shoe on a wearer's foot. The shoelace then has a middle which extends directly between the uppermost eyelets, and which is closer to one of the Velcro or other retainers at marked retainer locations than the distance between the two retainer locations at the same end portion of the shoelace. A tube can be provided through which the middle of the shoelace projects, with the shoelace tied in knots against opposite ends of the tube. This prevents the shoelace from shifting position, so the projecting opposite end portions of the shoelace are of equal length.

The retainer locations on the first end portion of the shoelace can be held together by a small hook device that has a pair of loops that each receives a shoelace location.

The novel features of the invention are set forth with particularity in the appended claims. The invention will be best understood from the following description when read in conjunction with the accompanying drawings.

DESCRIPTION OF THE PREFERRED EMBODIMENT

Figure 1:
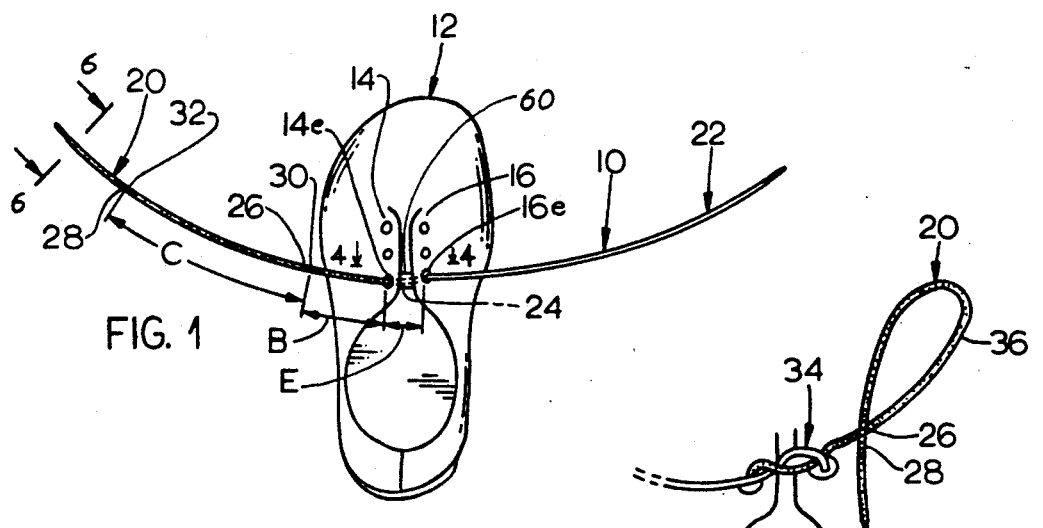
FIG. 1 is a plan view of a shoelace constructed in accordance with the present invention, shown mounted on a shoe but before the beginning of bow tying.

FIG. 1 illustrates a shoelace 10 of the present invention, shown mounted on a shoe 12 but not yet tied. The shoe has two rows of eyelets devices or eyelets 14, 16 (which can be ordinary eyelets, pivoting rings, etc.) they include uppermost eyelets 14e and 16e. The shoelace has first and second end portions 20, 22 that project from the uppermost eyelets 14e, 16e and has a middle portion 24 extending between the eyelets. The first end portion 20 of the shoelace has a pair of marked retainer locations formed by retainers such as Velcro pads 26, 28 (one of hook type and the other of loop type) positioned at inner and outer locations 30, 32 along the first end portion of the shoelace. The first end portion of the shoelace is of moderate stiffness, and this combined with the retainer devices greatly aids children and the handicapped in tying a bow. The other end portion 22 can be fully flexible.

Figure 2:
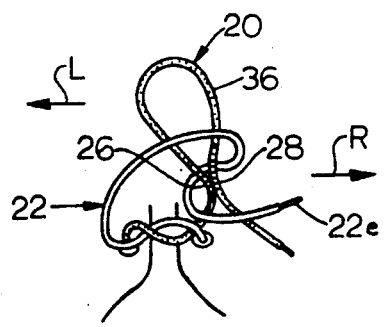
FIG. 2 is a partial top view of the shoelace of FIG. 1, shown during an early stage in bow tying.
Figure 3:
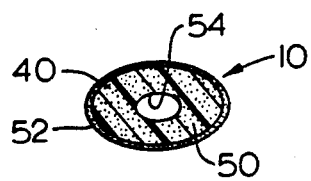
FIG. 3 is a view similar to that of FIG. 2, with the shoelace shown during a later stage in bow tying.

FIG. 2 illustrates an early step in the tying of a bow, which involves first forming a single interlacement 34. Then a loop 36 is formed by bringing the outer retainer device 28 against the inner one 26. As shown in FIG. 3, where a single loop bow is to be formed, the second end portion 22 can then be wrapped about the loop 36; than the loop 36 is pulled to the left L and the outer end 22e of the second end portion is pulled to the right R to tie the single bow. A major problem that young children and the handicapped have in tying a bow, is in keeping the first end portion 20 of the shoelace in a loop configuration while they concentrate their attention on wrapping the second end portion 22 around that loop. By providing the retention devices 26, 28, which are clearly marked, and by providing a shoelace with a moderately stiff first end portion 20, the loop is made to retain its shape until the bow is tied.

Figure 7:
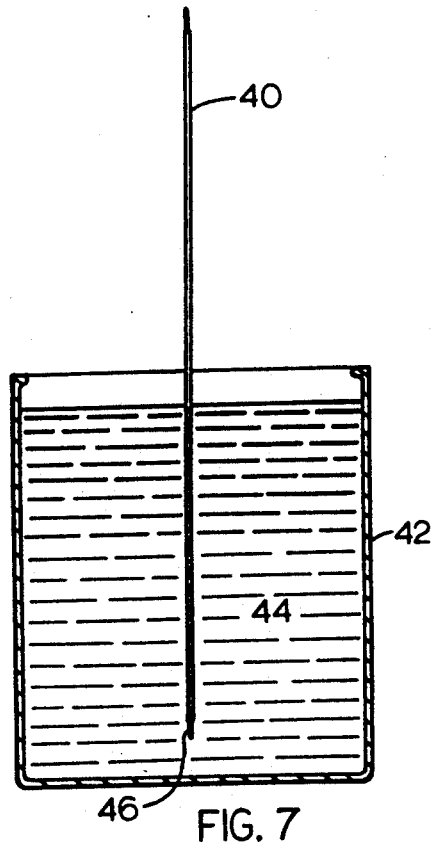
FIG. 7 is a sectional side view showing a step in the process of construction of the shoelace of FIG. 1.

A prior art way for creating a shoelace end portion stiff enough to substantially retain the loop shape to which it is bent, but with the stiffness being low enough to permit children and the retarded to easily bend the end portion, is to include a metal wire within a woven sheath that is the construction of an ordinary shoelace. It is found that in practice the wire easily kinks and has a memory that causes it to tend to retain the shape to which it is bent, which makes manipulating the shoelace end portion difficult. Applicant creates a stiffened shoelace end portion by the method shown in FIG. 7, wherein a porous shoelace core 40, generally of woven construction, is dipped in a bath 42 of a stiffening material 44. The stiffening material 44 is of a type which is originally liquid, but which solidifies at a time after the shoelace is removed from the bath. After removal, the dipped portion of the shoelace is wiped to remove substantially all of the liquid stiffening material, except that which has penetrated the shoelace core and except for a thin layer which lies on the surface of the shoelace core.

Applicant finds that good results are obtained when a woven cotton shoelace is dipped in Plasti Dip sold by TBI, Inc. of Blain, Minn. This composition is a liquid polymer which is advertised for use in coating the handles of pliers and other hand tools by dipping the handle in the material and allowing the material clinging to the handle to dry. Instead of allowing the material clinging to the dipped shoelace to remain, applicant wipes it off, and finds that this provides an appropriate degree of stiffness. Applicant dips the shoelace in the bath of the stiffening material for a brief period such as a few seconds, and then pulls out the shoelace and immediately wipes off liquid material. The remaining material is allowed to dry. The particular material Plasti Dip provides a distinctive color to the shoelace, applicant preferring the red color when applied to a shoelace core which is originally yellow, so the stiffening material also colors the first end portion of a shoelace. The stiffening material increases the weight per unit length of the shoelace by only about 10%.

Figure 8:
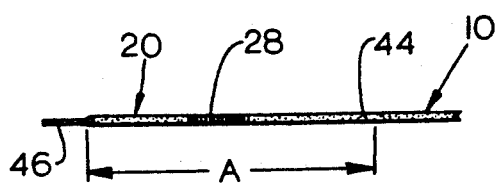
FIG. 8 is a side view of a portion of the shoelace of FIG. 1.

The stiffness of the first end portion of the shoelace is sufficient that when a location 44 (FIG. 8) spaced a distance A of four inches from the end of the flexible core (inward of the rigid fitting 46 at the extreme end of the shoelace) is held so it extends primarily (within 45° of) horizontal, it is possible to position the extreme end of the shoelace at fitting 46 can be located as high as the held location 44. Actually, this occurs for a length A of up to about six inches. For a flexible shoelace core without the stiffening material therein, this can be achieved for a length A of only up to 2½ inches. It is noted that the vertical deflection of the end of a cantelevered beam varies with the square of the length of the beam. Therefore, it can be said that applicant's moderately stiff first end portion is more than twice as stiff as the shoelace core (which deflects for A=2½ inches) if applicant's moderately stiff end portion deflects for $A = 3\frac{1}{2}$ inches ($2\frac{1}{2} \times \sqrt{2}$). Applicant finds that the polymer stiffening material does not have the disadvantages of a metal wire within a fabric, of kinking and of retaining the shape to which it is bent and resisting bending to a new shape.

Figure 6:
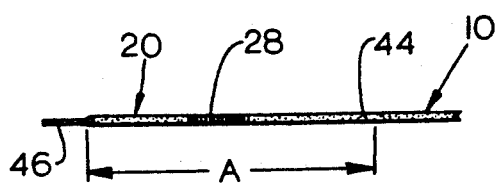
FIG. 6 is a sectional view taken on the line 6—6 of FIG. 1, showing details of the shoelace construction.

FIG. 6 shows a cross section of the shoelace 10, showing the core 40, a quantity 50 of penetrating stiffening material within the core, and a thin coating 52 around the core which serves primarily to color the core.

Figure 4:
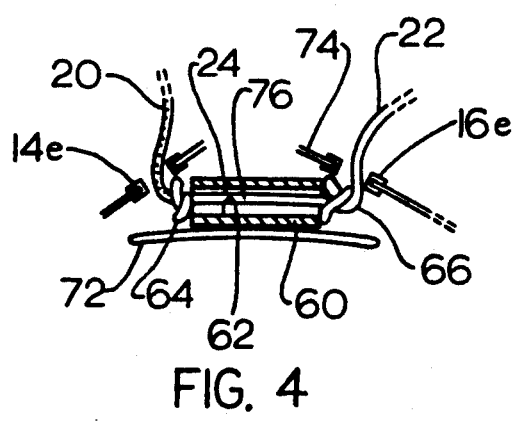
FIG. 4 is a view taken on the line 4—4 of FIG. 1.
Figure 5:
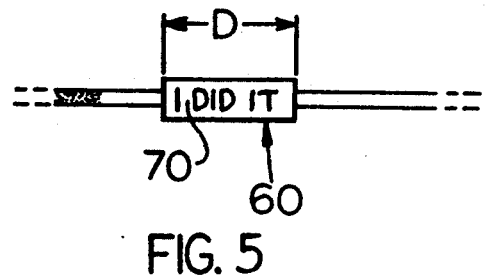
FIG. 5 is a plan view of the middle of the shoelace of FIG. 4, but before tying of knots.

It is possible to provide a long shoelace which is threaded through all of the eyelets of a shoe before a bow is tied. However, in many situations it is desirable to enable rapid installation and removal of a training shoelace without the bother of threading it through all the eyelets of a shoe. Applicant provides a shoelace only long enough to leave ends for bow tying when the shoelace extends directly between the uppermost eyelets 14e, 16e (FIG. 4). Applicant also provides a tube 60 whose inside passageway 62 is large enough to readily thread the shoelace through it. After the shoelace is threaded through the tube, knots 64, 66 can be tied in the shoelace adjacent to the opposite ends of the tube. Each knot is a single knot, and the passageway in the tube is small enough that the single knot is large enough to prevent it from readily passing through the tube passageway. The tube and knots enable the shoelace to be established so that the opposite end portion 20, 22 are of equal length, or of a desired unequal length whenever the shoelace is used. The tube can instead be crimped to the shoelace to fix its position without knots. As shown in FIG. 5, the tube 60 has a decoration 70 on its outside which encourages a young child or handicapped person to learn to tie a bow. After the child or handicapped person learns to tie a bow, the tube is removed and given to the child or handicapped person to serve as evidence that they accomplished the feat of learning to tie a bow. The tube can be very short, in which case it can be described as a short tube or ring.

The middle portion 24 of the shoelace (which has a middle point 76), which extends between the opposite eyelets 14e, 16e has a short length E (FIG. 1) which is no more than about three inches. When installed on a shoe, the distance B between an eyelet 14e and the innermost retainer 26 is less than the distance C between the two retainers 26, 28. As shown in FIG. 5, the length D of the tube 60 is generally no more than two inches, and as shown in FIG. 4, the tube lies over the tongue 72 of the shoe and below the level of the shoe overlays 74 which contain the eyelets 14e, 16e.

Applicant has constructed shoelaces of the type shown, of a woven fabric shoelace core having a width of about ⅛th inch and length of about 18 inches. A length of shoelace of about 7¼ inches was dipped into the above-mentioned liquid polymer stiffening material, wiped off, and allowed to dry. The rest of the core of the shoelace (10¼ inches) was left alone, to serve as the second end of the shoelace. The unstiffened core portion or the stiffened portion, can be used to tie the knots 64, 66 at opposite ends of the tube. The distance C between retainer locations was 5¼ inches. It is possible to stiffen the entire length of the shoelace core, with the opposite end portions preferably impregnated with stiffening material of different colors.

Figure 9:
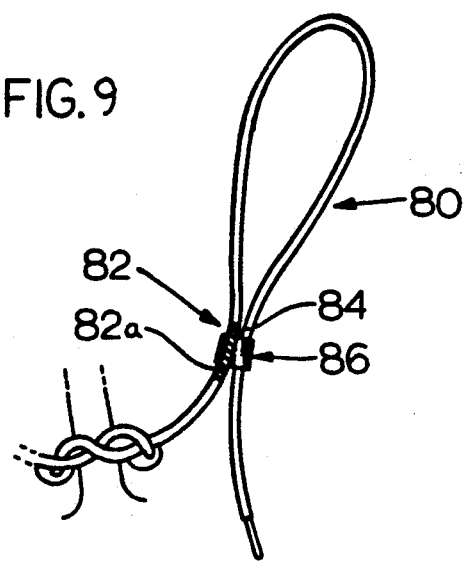
FIG. 9 is a partial top view of a shoelace and a hook device, constructed in accordance with another embodiment of the invention.
Figure 10:
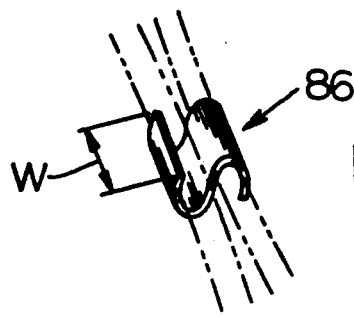
FIG. 10 is a perspective view of the hook device of FIG. 9.
Figure 11:
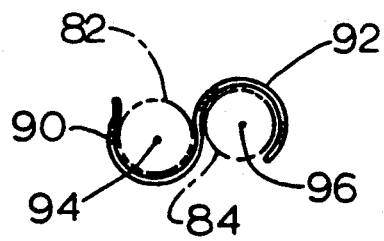
FIG. 11 is an end view of the hookdevice of FIG. 10.

FIGS. 9–11 illustrate a shoelace 80 with retainer locations 82, 84 temporarily held together by a hook device 86. The hook device includes a pair of adjacent loops 90, 92 that each grips the shoelace at one of the retainer locations to temporarily hold them together. The hook device is formed by bent sheet metal of a width W on the order of ⅛ths inch (usually about ⅛th inch), of a material such as brass, and is bent about axes 94, 96 extending parallel to its width to form the loops. The loop 92 preferably securely holds to the shoelace location 84 so it is substantially permanently installed. The other loop 90 is formed so the shoelace location 82 can be installed by a child by merely pressing the shoelace through the loop opening 94. Both locations 82, 84 are marked, with the hook device forming a marking at location 84 and with a separate colored marking 82a at the location 82. The elastic compression of the shoelace holds it in place during tying of a bow.

While the hook device 86 prevents the shoelace locations 82, 84 from separating, it allows at least one of them 82 to slide relative to the hook device, which can facilitate tying of a bow. The miniature hooks and loops on Velcro-type fasteners create drag that greatly resists sliding of shoelace locations held together by Velcro pads. Velcro pads are usually sewn onto shoelace cores, which results in considerable bulk at the retainer locations. This can create a large bow middle where the retainer locations lie over the interlacement (34 in FIG. 2) in the final bow. The hook device is thin. In addition, the hook device is of low cost and can be used with shoelaces of round cross section (it is difficult to sew Velcro pads to them).

One of the loops 92 of the hook device extends by much more than 200° about the axis 96 to prevent children from pulling the device off the shoelace, and preferably tightly holds the shoelace to resist sliding of the shoelace along the axis 96. The other loop 90 extends by about 200° about the axis 94 to allow pressing the shoelace into the loop 90 by a child. The loop 90 also is constructed to allow the shoelace to slide along the axis with only moderate frictional resistance.

Thus, the invention provides a teaching or training shoelace which is more easily manipulated than those of the prior art and which can be easily installed and removed from a shoe. At least one end portion of the shoelace includes a porous core, generally a woven fabric, which is impregnated by a solidified, originally-liquid stiffening material such as a polymer of the type described above. The shoelace is relatively short, in that the distance between an innermost retainer locations and the middle of the shoelace, is less than the distance between the two retainer locations at the first end portion of the shoelace. This allows the shoe to be installed by threading it directly through the two uppermost eyelets of a shoe and not through the other eyelets. A tube can be provided through which the shoelace readily passes, but which does not pass a single tied knot. This facilitates keeping the opposite end portions of the shoelace of equal length (or a desired amount of unevenness). A retainer device for temporarily keeping the retainer locations together, can be formed by a hook device having a pair of loops that each receives a retainer location of the shoelace.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A combination of a shoe and shoelace for use by young children or the handicapped to help learn to tie a bow comprising:
   a flexible porous shoelace core having first and second opposite end portions;
   a solidified originally-liquid stiffening material penetrating and coating said first end portion and making said first end portion stiffer than said flexible shoelace core without said stiffening material, said first end portion being stiff enough to retain a loop shape when a pair of locations spaced a plurality of inches apart along said first end portion are held together to form a loop shape between them;
   a shoe having two rows of eyelet devices, including an uppermost eyelet in each row that are spaced apart by no more than about two inches;
   said shoelace has a middle portion lying between said end portions, said middle portion of said shoelace has a length no more than about three inches and extends directly between said uppermost eyelets, with said opposite and portions projecting from said uppermost eyelets;
   a tube having opposite ends and lying between said uppermost eyelets, said middle portion of said shoelace projecting through said tube and said shoelace being tied in a knot between each end of said tube and a corresponding one of said uppermost eyelets.

2. A shoelace for mounting on an ordinary shoe having two rows of eyelets, including an uppermost eyelet in each row with said uppermost eyelets spaced apart from each other by no more than about two inches, for use by young children and the handicapped to help learn to tie a bow, comprising:
   a shoelace with first and second end portions and a middle portion, said first end portion having first and second marked locations spaced apart by a plurality of inches, and retainer means for temporarily holding said locations together when brought together to hold the shoelace portion between them in a loop, said first location lying closer to said shoelace middle portion than said second location;
   said middle portion having a length no more than about three inches, and said shoelace having a length chosen so when it extends substantially directly between said uppermost eyelets, with said shoelace end portions extending out beyond said eyelets by about same length, said first location lies closer to a closest one of said eyelets than the distance between said marked locations;
   a tube with opposite ends having a length no more than two inches, said tube having an opening sufficient to freely project said shoelace middle portion therethrough but small enough that a single knot in said shoelace middle portion cannot freely pass through said tube.

3. The shoelace described in claim 2 wherein:
   said shoelace middle portion projects through said tube and has a knot adjacent to each of said opposite tube ends, said tube lies under and between said uppermost eyelets of said shoe, and said shoelace end portions each project from one of said knots through one of said eyelets.

* * * * *